(12) United States Patent
Aselage et al.

(10) Patent No.: US 9,302,414 B2
(45) Date of Patent: Apr. 5, 2016

(54) MOLDED ACTIVE PLASTICS COMPONENTS FOR A VEHICLE AIRBAG ASSEMBLY

(71) Applicant: Ford Global Technologies, LLC, Dearborn, MI (US)

(72) Inventors: Brandon Aselage, White Lake, MI (US); Sean Bayle West, Monroe, MI (US); Stacey H. Raines, Ypsilanti, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 14/312,825

(22) Filed: Jun. 24, 2014

(65) Prior Publication Data

US 2015/0367808 A1  Dec. 24, 2015

(51) Int. Cl.
```
B29C 45/14      (2006.01)
B60R 21/205     (2011.01)
B60R 21/206     (2011.01)
B29L 31/30      (2006.01)
B60R 21/217     (2011.01)
B60R 21/235     (2006.01)
```

(52) U.S. Cl.
CPC ......... *B29C 45/14008* (2013.01); *B60R 21/205* (2013.01); *B60R 21/206* (2013.01); *B60R 21/217* (2013.01); *B60R 21/2176* (2013.01); *B29L 2031/3038* (2013.01); *B60R 2021/2173* (2013.01); *B60R 2021/23514* (2013.01)

(58) Field of Classification Search
None
See application file for complete search history.

(56) References Cited

U.S. PATENT DOCUMENTS

| | | | |
|---|---|---|---|
| 5,118,133 A | 6/1992 | Zushi et al. | |
| 5,346,249 A * | 9/1994 | Hallard | B60R 21/21656 280/728.3 |
| 5,427,405 A * | 6/1995 | Kuretake | B60R 21/217 280/728.2 |
| 5,746,618 A | 5/1998 | Gauker | |
| 6,039,380 A * | 3/2000 | Heilig | B60R 21/02 280/752 |
| 6,299,208 B1 * | 10/2001 | Kasahara | B60R 7/06 280/748 |
| 6,302,437 B1 * | 10/2001 | Marriott | B60R 21/20 280/728.3 |
| 6,705,638 B2 * | 3/2004 | Abe | B60R 21/205 280/730.1 |
| 6,758,493 B2 * | 7/2004 | Conlee | B60R 21/045 224/280 |
| 6,874,811 B2 * | 4/2005 | Enders | B60R 21/206 280/730.1 |
| 6,971,667 B2 * | 12/2005 | Enders | B60R 21/206 280/730.1 |
| 6,976,706 B2 * | 12/2005 | Smith | B60R 21/206 280/730.1 |
| 6,991,252 B2 * | 1/2006 | Enders | B60R 21/217 280/728.1 |
| 7,407,180 B2 * | 8/2008 | Yokoyama | B60R 21/205 280/728.2 |
| 7,878,532 B2 * | 2/2011 | Sasaki | B60R 7/06 280/728.2 |
| 8,215,667 B2 * | 7/2012 | Matsushima | B60R 21/201 280/728.3 |
| 8,267,427 B2 * | 9/2012 | Fukawatase | B60R 21/201 280/743.1 |
| 8,308,189 B2 * | 11/2012 | Matsushima | B60R 21/206 180/90 |
| 8,491,008 B2 * | 7/2013 | Roychoudhury | B60R 21/235 280/752 |
| 2002/0135161 A1 | 9/2002 | Lamb et al. | |
| 2007/0101671 A1 * | 5/2007 | Deeks | B29C 39/10 52/578 |
| 2012/0108122 A1 | 5/2012 | Elia et al. | |
| 2012/0108125 A1 | 5/2012 | Elia et al. | |
| 2013/0277950 A1 | 10/2013 | Yamami | |

FOREIGN PATENT DOCUMENTS

DE      102009047295      6/2011

* cited by examiner

*Primary Examiner* — Nicole Verley
(74) *Attorney, Agent, or Firm* — Vichit Chea; Price Heneveld LLP

(57) ABSTRACT

An airbag assembly includes inner and outer panels that are coupled to define a cavity therebetween, an inflatable member disposed within the cavity and at least one reinforcing band disposed within at least the inner panel. The reinforcing band includes a plurality of glass fibers, and each of the plurality of glass fibers includes a coating layer.

16 Claims, 10 Drawing Sheets

MOLDED ACTIVE PLASTICS COMPONENTS FOR A VEHICLE AIRBAG ASSEMBLY

FIELD OF THE INVENTION

The present invention generally relates to vehicle airbag assemblies, and more specifically, airbag assembly components containing active reinforcing members.

BACKGROUND OF THE INVENTION

Typically, automobiles contain various airbag assemblies throughout the passenger cabin in order to substantially minimize injuries to occupants of a vehicle during collision events. Most airbag assemblies include a reaction surface against which an inflatable bladder or airbag inflates during the collision. Due to the speed at which the inflatable bladder or airbag reaches an inflated state, the reaction surface can be put under substantially high stresses during the inflation event.

SUMMARY OF THE INVENTION

According to one aspect of the present invention, an airbag assembly includes an airbag panel having an inflatable member disposed within the cavity defined between an inner reaction plate and an outer panel and at least one reinforcing band within at least a portion of the airbag panel. The at least one reinforcing band includes a plurality of glass fibers, each of the glass fibers being individually encased within an outer coating layer and set in a substantially parallel configuration.

According to another aspect of the present invention, an airbag assembly includes inner and outer panels that are coupled to define a cavity therebetween, an inflatable member disposed within the cavity and at least one reinforcing band disposed within at least the inner panel. The reinforcing band includes a plurality of glass fibers, and each of the plurality of glass fibers includes a coating layer.

According to another aspect of the present invention, a method for forming an airbag assembly includes the steps of providing at least one reinforcing band, wherein the at least one reinforcing band includes a plurality of glass fibers, each of the plurality of glass fibers being individually encased within an outer coating layer and set in a substantially parallel configuration. The at least one reinforcing band is placed within a forming mold, wherein the forming mold is one of an injection forming mold and a compression forming mold. Plastic is formed within the forming mold and at least partially around the at least one reinforcing band to form at least an inner reaction plate. An outer panel and an inflatable member are provided and the inflatable member is placed within a cavity formed between the inner reaction plate and the outer panel to form an airbag panel.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
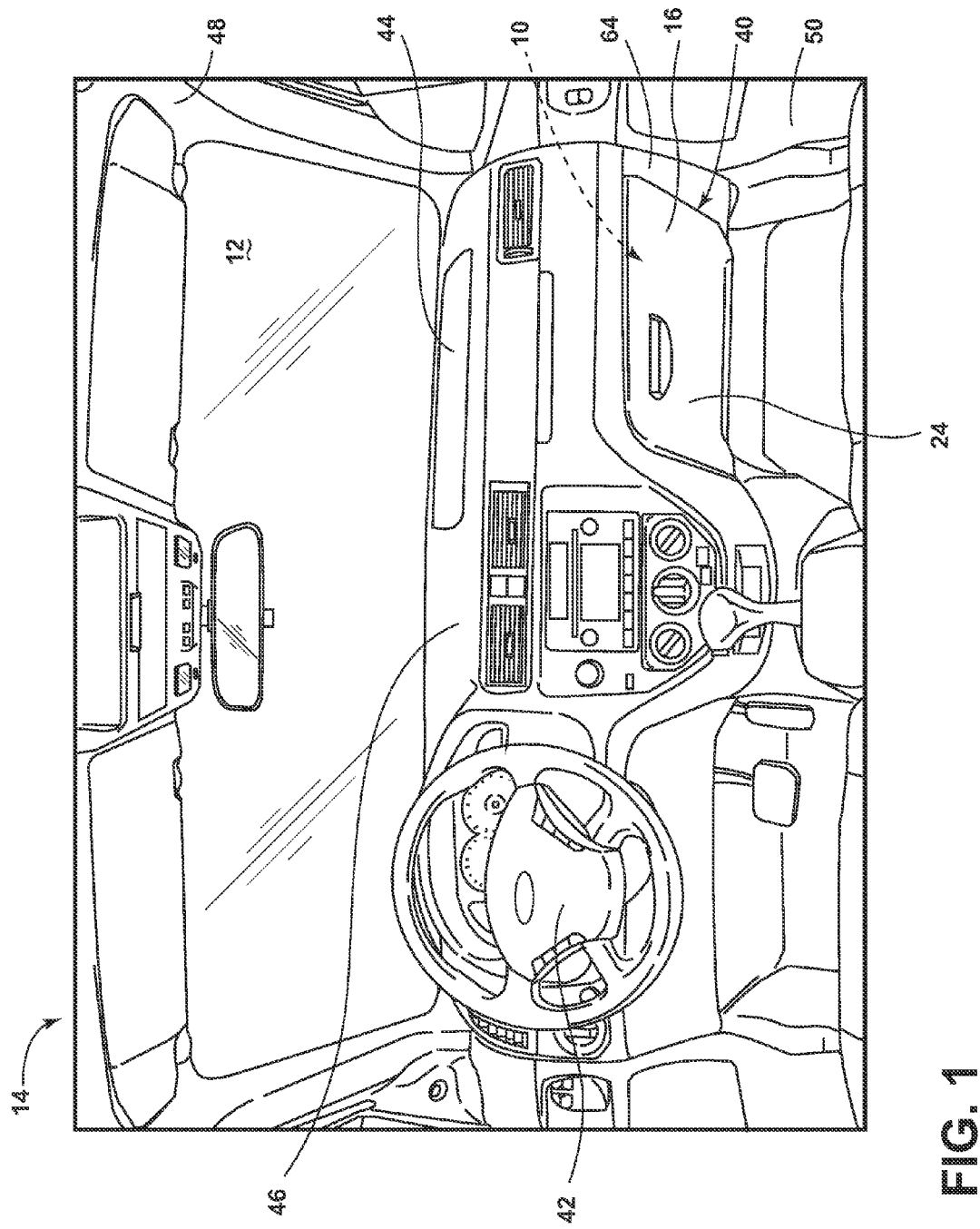
FIG. 1 is a front perspective view of a vehicle dashboard with an embodiment of the reinforced reaction plate installed within an airbag assembly.
Figure 2:
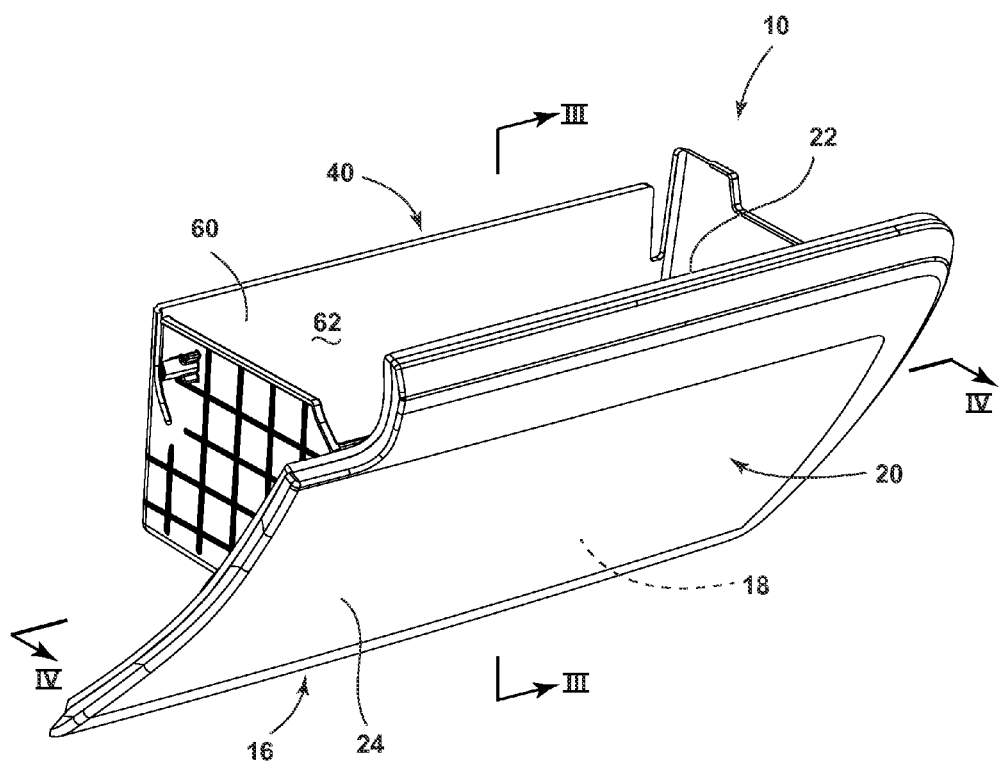
FIG. 2 is a top perspective view of a glove box bin having an airbag assembly that incorporates an alternate embodiment of the reinforced reaction plate.
Figure 3:
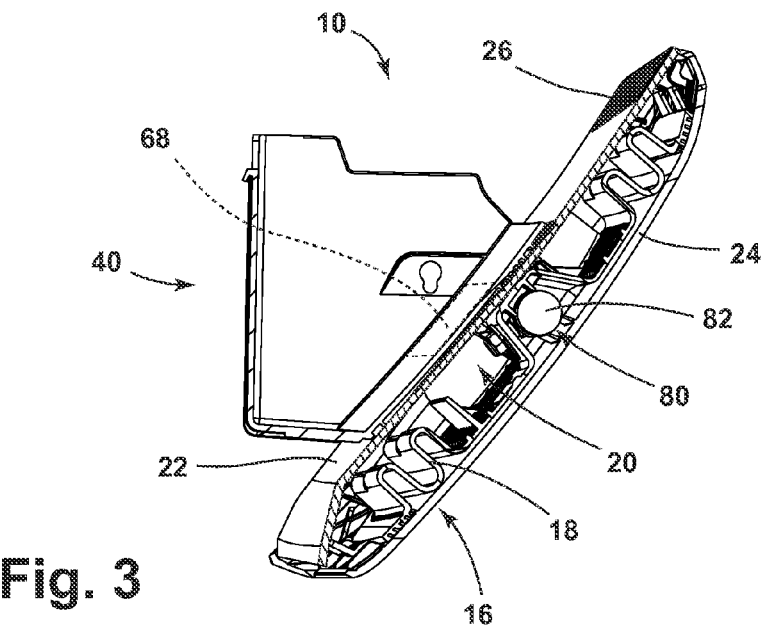
FIG. 3 is a cross-sectional view of the glove box bin and airbag assembly of FIG. 2 taken along line III-III.
Figure 4:
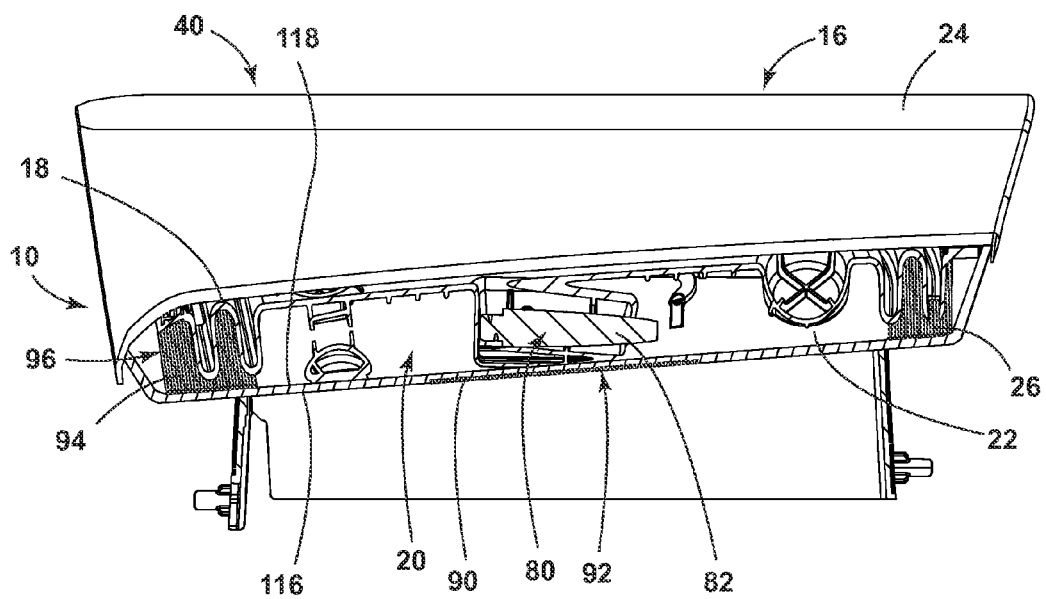
FIG. 4 is a cross-sectional view of the glove box bin and airbag assembly of FIG. 2 taken along line IV-IV.
Figure 5:
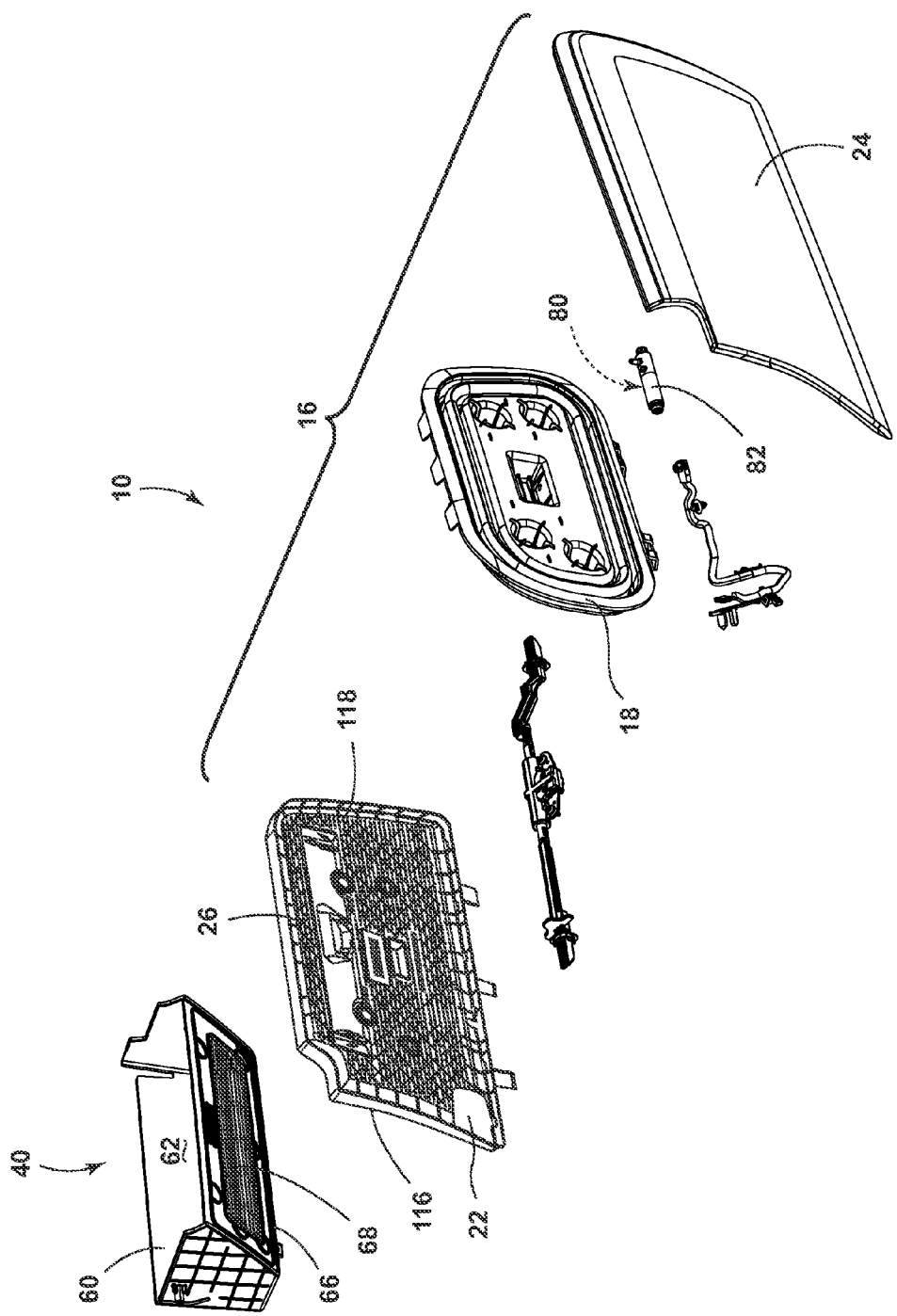
FIG. 5 is an exploded top perspective view of the glove box bin and airbag assembly of FIG. 2.
Figure 6:
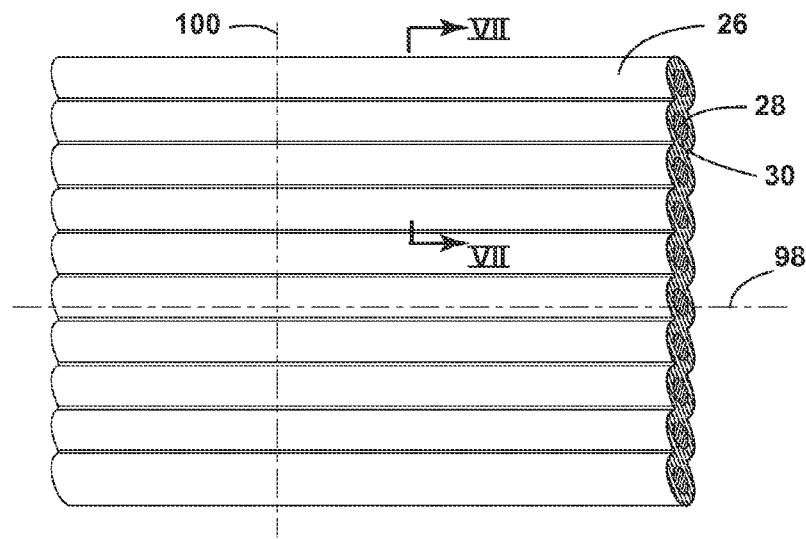
FIG. 6 is an enlarged perspective view of an embodiment of the reinforcing band.
Figure 7:
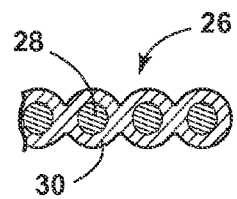
FIG. 7 is a schematic cross-sectional view taken along line VII-VII of the reinforcing band of FIG. 6.
Figure 8:
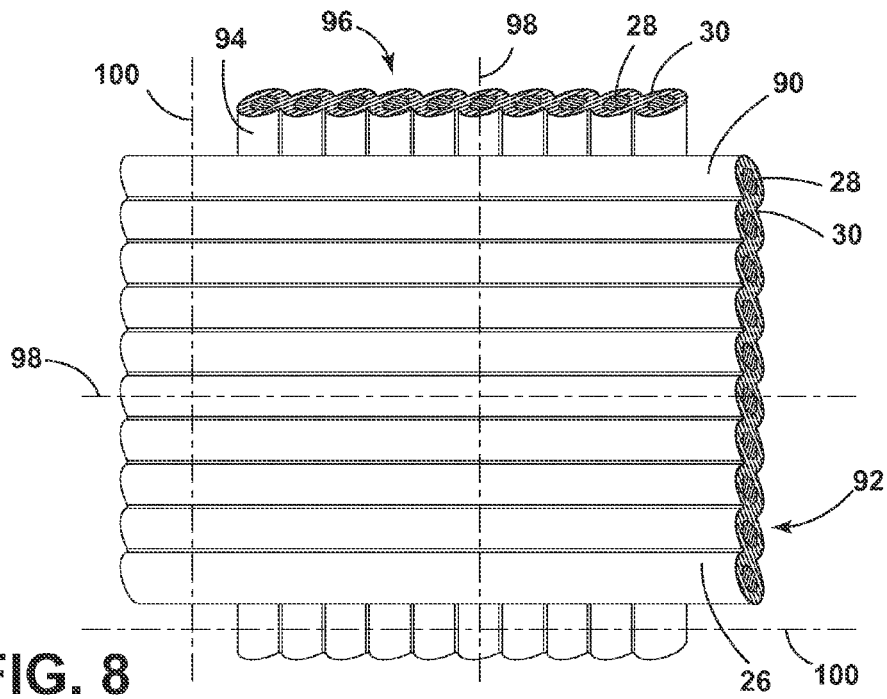
FIG. 8 is a detail schematic view of an alternate embodiment of the reinforcing bands disposed in a bi-directional configuration.
Figure 9:
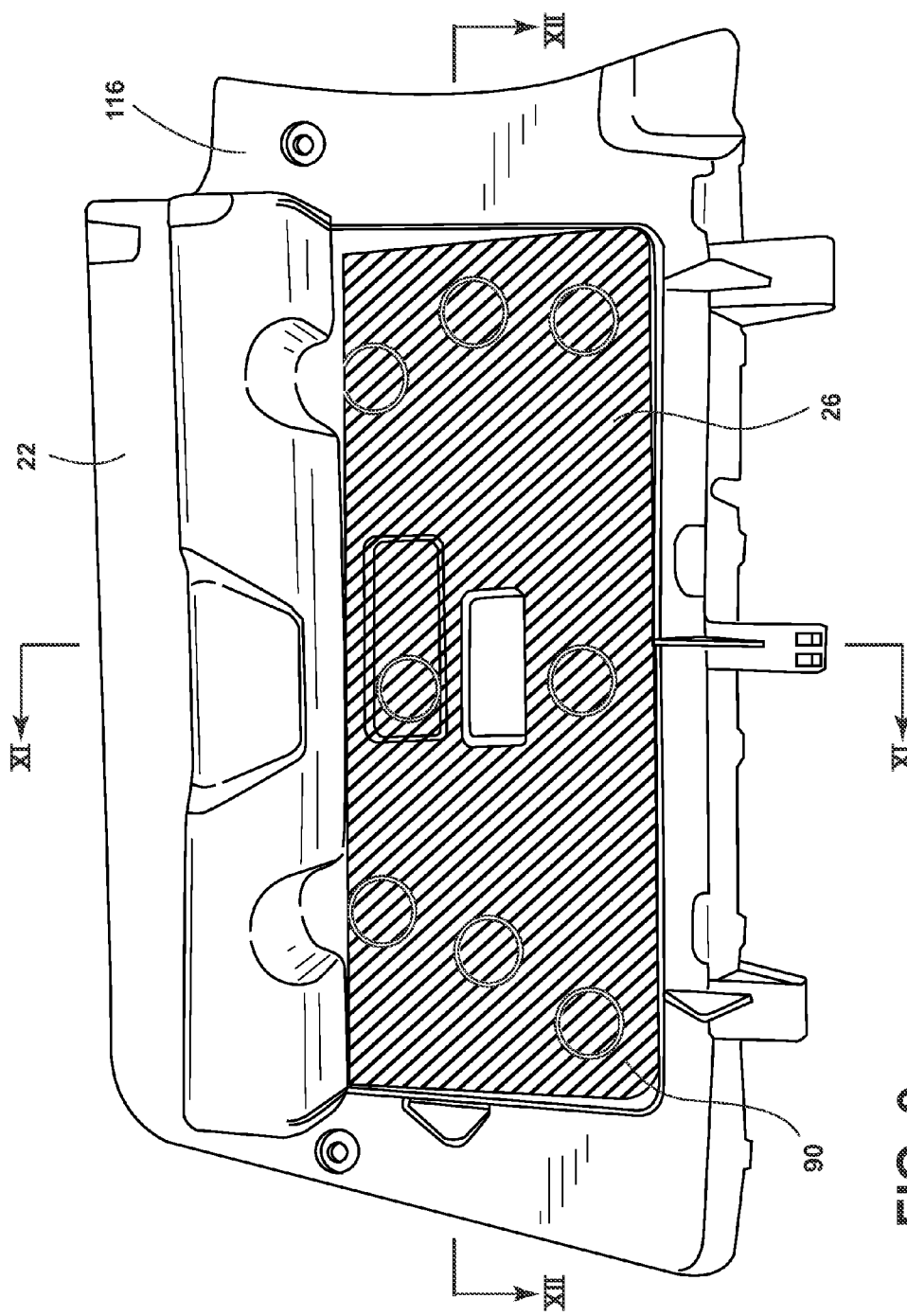
FIG. 9 is a first side elevational view of another alternate embodiment of the reinforced reaction plate.
Figure 10:
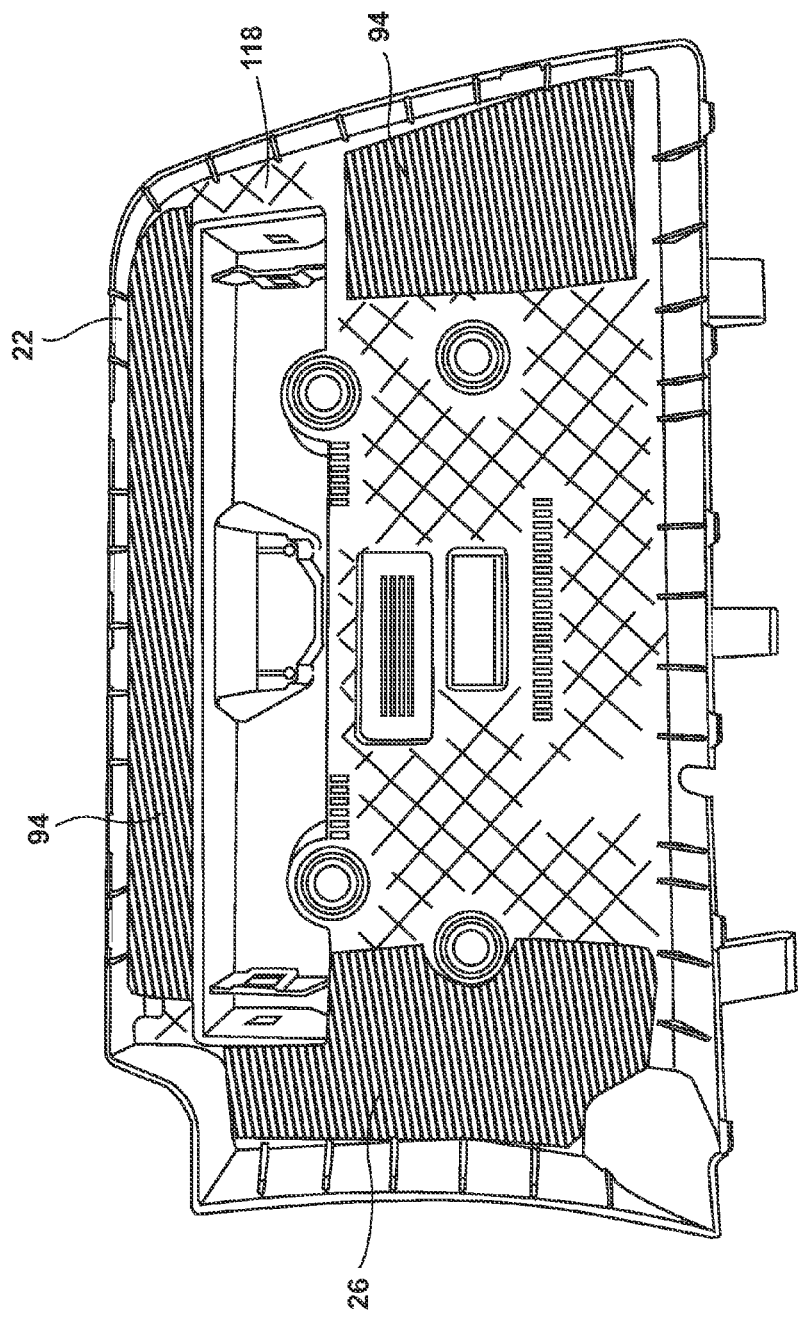
FIG. 10 is a second side elevational view of the reinforced reaction plate of FIG. 9.
Figure 11:
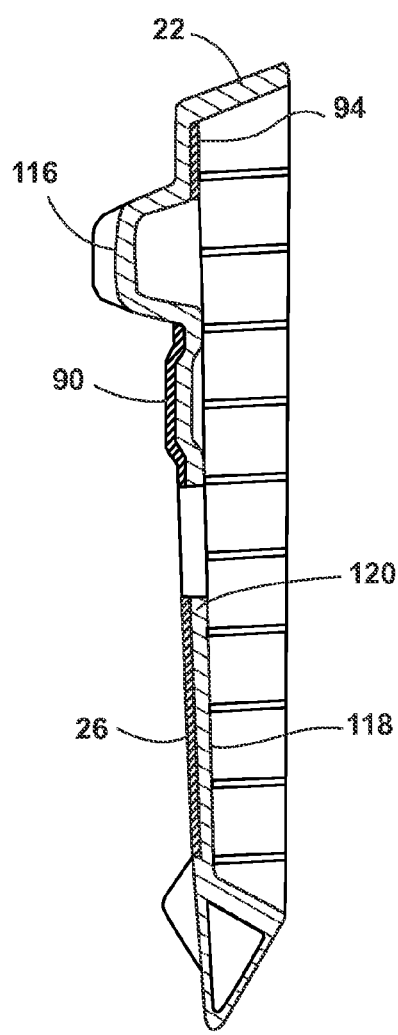
FIG. 11 is a cross-sectional view of the reinforced reaction plate of FIG. 9 taken along line XI-XI.
Figure 12:
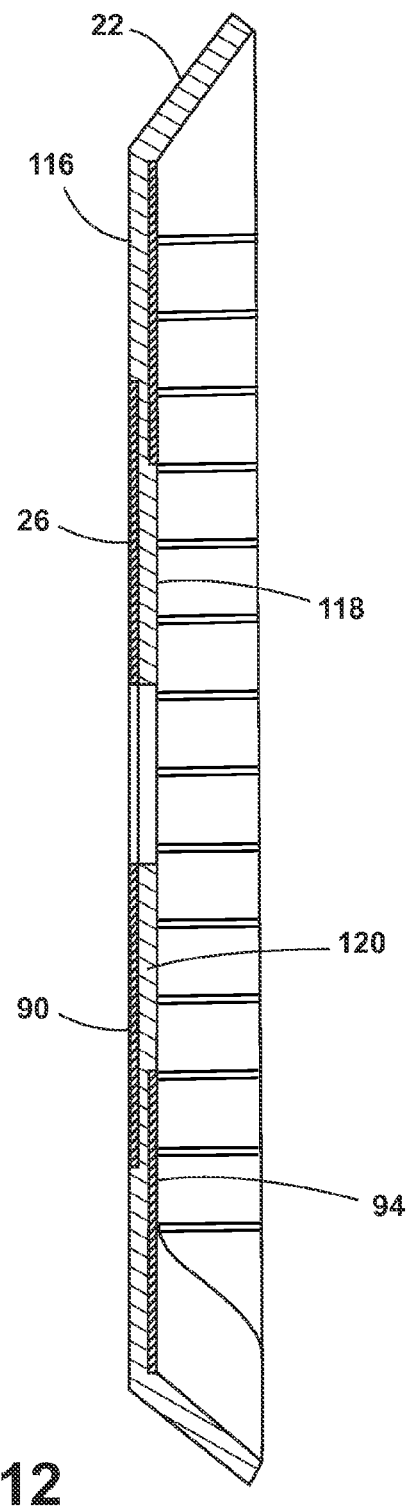
FIG. 12 is a cross-sectional view of the reinforced reaction plate of FIG. 9 taken along line XII-XII.
Figure 13:
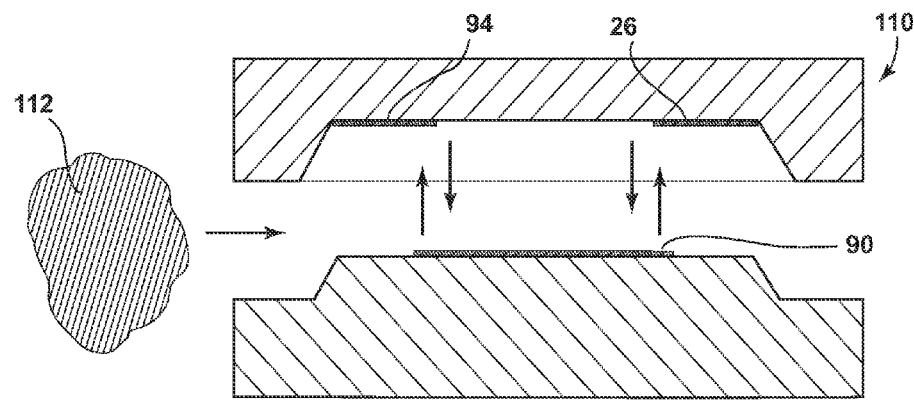
FIG. 13 is a schematic cross-sectional view of an open molding form with reinforcing bands disposed therein.
Figure 14:
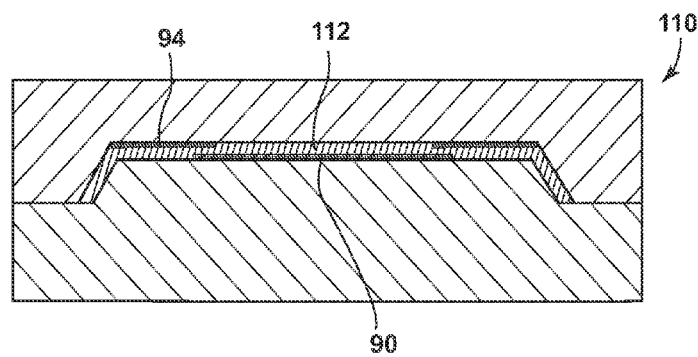
FIG. 14 is a schematic cross-sectional view of the closed molding form of FIG. 13 with the reinforcing bands disposed therein.
Figure 15:
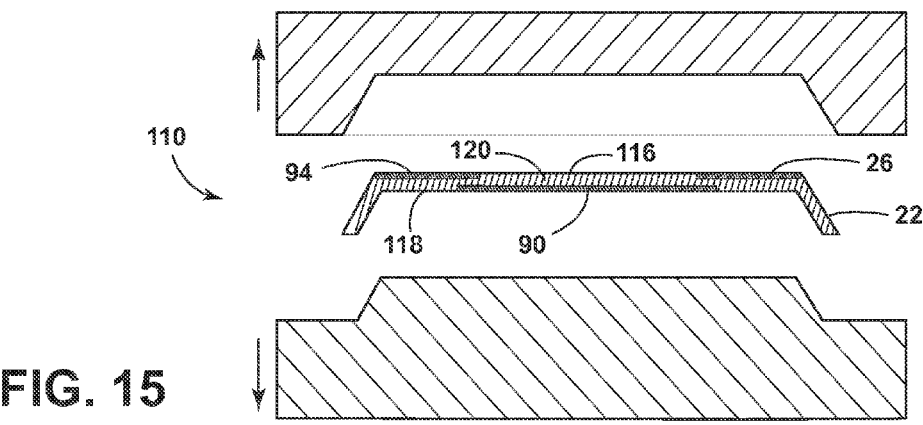
FIG. 15 is a schematic cross-sectional view of the closed molding form of FIG. 14 with a formable material within the molding form and the reinforcing bands embedded in the formable material.
Figure 16:
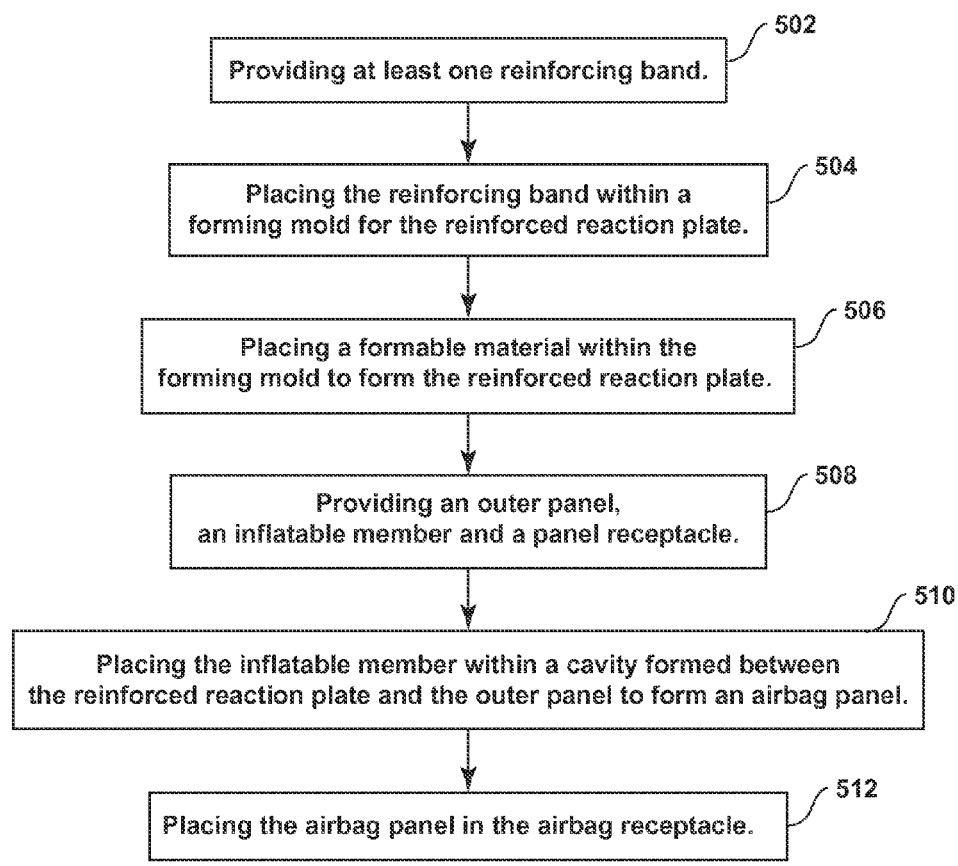
FIG. 16 is a schematic flow diagram illustrating a method for forming a reinforced reaction plate using an embodiment of the reinforcing bands.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-7, reference numeral 10 generally refers to an airbag assembly installed within a passenger cabin 12 of a vehicle 14, according to one embodiment. The airbag assembly 10 includes an airbag panel 16 having an inflatable member 18 disposed within a cavity 20 defined between an inner reinforced reaction plate 22 and an outer panel 24. At least one reinforcing band 26 is disposed within at least a portion of the airbag panel 16. The reinforcing band 26 includes a plurality of glass fibers 28, where each of the plurality of glass fibers 28 is individual encased within an outer coating layer 30. Each of the plurality of glass fibers 28 is set in a substantially parallel configuration relative to one another.

Referring again to FIG. 7, the airbag assembly 10 can be disposed in various locations throughout the passenger cabin 12 of the vehicle 14, where such locations can include, but are not limited to, the glove box, the steering wheel 42, the passenger side 44 of the dashboard 46, under the dashboard 46, upper curtain areas 48 of the passenger cabin 12, side panels 50 of the passenger cabin 12, as well as others.

As illustrated in FIGS. 1-5, in various embodiments, the airbag assembly 10 can include an inner panel, such as the reinforced reaction plate 22, and an outer panel 24 that are coupled to define a cavity 20 therebetween, and where the inflatable member 18 is disposed within the cavity 20. It is contemplated that such an assembly can be incorporated into a compartment door, such as that of a glove box assembly 40. The reinforced reaction plate 22 and outer panel 24 that form the compartment door can be attached to a bin 60 having an internal volume 62 that forms the glove box assembly 40. It is also contemplated that the glove box assembly 40 can be disposed within a molded surround 64 that is set within the dashboard 46 of the vehicle 14. The bin 60 can include a panel receptacle 66 for receiving the airbag panel 16. In such an embodiment, the panel receptacle 66 can include a receptacle reinforcing band 68, wherein the receptacle reinforcing band 68 includes at least one of the reinforcing bands 26 of the airbag assembly 10. It is contemplated that the reinforcing bands 26 can be disposed within various other components of the airbag assembly 10, including, but not limited to, the molded surround 64 of the airbag assembly 10, the outer panel 24, and other various components of the airbag assembly 10. In such an embodiment, the bin 60 and the airbag panel 16 are supported within the dashboard 46 by the molded surround 64.

Referring again to FIGS. 1-6, the inflatable member 18 of the airbag panel 16 can be an inflatable bladder that inflates to push a bolster in an outward direction away from the reinforced reaction plate 22. In various alternate embodiments, the inflatable member 18 can be an inflatable cushion or airbag that projects through the outer panel 24 during an inflation event. In the various embodiments, the inflation of the inflatable member 18 exerts an opposing force against the reinforced reaction plate 22 and the outer panel 24. While the outer panel 24 is designed to move outward or to split to allow for the inflation of the inflatable member 18, the reinforced reaction plate 22 is designed to substantially maintain its position as the airbag panel 16 operates during an inflation event.

Referring now to FIGS. 2-6, it is contemplated that the reinforced reaction plate 22 of the airbag assembly 10 is adapted to receive the inflatable member 18 of the airbag assembly 10. Accordingly, during an inflation event, such as a collision or other impact, the inflatable member 18 receives an inflation gas 80 from the inflator 82 of the airbag assembly 10 and rapidly inflates. This rapid inflation places a significant amount of stress upon the reinforced reaction plate 22. As will be discussed more fully below, the reinforcing bands 26 of the reinforced reaction plate 22 serve to strengthen and provide greater structural integrity to the reinforced reaction plate 22 during an inflation event. As such, the reinforcing bands 26, during inflation, limit the amount that the reinforced reaction plate 22 tends to bend or flex during an inflation event.

In conventional airbag assemblies, deflection, torsion, or other bending in the reaction plate during an inflation event can negatively impact the rate of inflation of the inflatable member 18 of the airbag assembly 10. Such deflection can partially close off or otherwise impede the flow of the inflation gas 80 from the inflator 82 to the inflatable member 18, thereby unpredictably lessening the inflation rate of the inflatable member 18. Due to the speed at which various impacts can occur, a substantially precise rate of inflation of an airbag assembly 10 can be significant in substantially minimizing injuries of occupants within a vehicle 14. Accordingly, the various embodiments of the reinforced reaction plate 22 that incorporate the reinforcing bands 26 can tend to minimize the deflection, twisting, or other bending within the reaction plate during an inflation event. In this manner, the reinforced reaction plate 22 allows the inflatable member 18 to operate substantially as designed during an inflation event without substantially impeding the flow of inflation gas 80 into the inflatable member 18.

Referring now to FIGS. 6-12, the various embodiments of the reinforcing bands 26 include the plurality of glass fibers 28 that are substantially oriented in a parallel configuration to form a substantially planar tape or band member that can be extended across a form within which the reinforced reaction plate 22 can be manufactured. In the various embodiments, each of these glass fibers 28 includes the outer coating layer 30 that individually encases each of the glass fibers 28. The outer coating layer 30 of each of the glass fibers 28 can include various materials that can include, but are not limited to, polypropylene, various other polymers, plastics, thermoplastics, and other similar coating materials. The glass fibers 28 included within the reinforcing bands 26 include substantially continuous fibers that run the entire length of the reinforcing bands 26. In this manner, the reinforcing bands 26 are made up of continuous fibers that are reinforced by outer coating layers 30, as described above. It is contemplated that in various embodiments, the reinforcing bands 26 can be manufactured to be similar to Celanese elongated glass fiber tape substantially similar to that manufactured by Ticona, according to various embodiments.

In the various embodiments, it is contemplated that the reinforcing bands 26 can be made with glass fibers 28 as well as other similar materials that can include, but are not limited to, resins, ceramics, polyester, polymers, carbon-based materials, steel, epoxy, and other similar materials that can be oriented into a fiber type configuration. Additionally, in the various embodiments, the outer coating layer 30 can be made of any one of various materials that can include, but are not limited to, thermoplastics, thermoplastic resin, polymers, polypropylene, and other similar coating-type materials. While the outer coating layer 30 is described as material that coats each of the individual glass fibers 28, it is contemplated that the outer coating layer 30 can fully impregnate the glass fiber 28, or other fiber-type material used in place of the glass fiber 28. In this manner, the outer coating layer 30 helps to reinforce the fiber material from within as well as around each of the individual fibers.

Referring again to FIGS. 6-12, the reinforcing bands 26 can be disposed within the reinforced reaction plate 22, according to various configurations, depending upon the design of the reinforced reaction plate 22, as well as other factors. These other factors can include, but are not limited to, the particular airbag assembly 10 being designed, the location of the airbag assembly 10 within the passenger cabin 12, the desired rate of inflation of the inflatable member 18, the size of the inflatable member 18, as well as other similar factors and considerations.

As illustrated in FIGS. 6-12, according to various embodiments, the reinforced reaction plate 22 can include a first reinforcing band 90 placed at a first angular orientation 92 within the reinforced reaction plate 22, and a second reinforcing band 94 that is placed within the reinforced reaction plate 22 at a second angular orientation 96, where the first angular orientation 92 is different than the second angular orientation 96. By way of explanation, and not limitation, the first reinforcing band 90 may be positioned substantially perpendicular to the second reinforcing band 94. The manner in which the reinforcing bands 26 are manufactured makes the reinforcing bands 26 resist deflection along a longitudinal axis 98 that is parallel to the glass fibers 28 of the reinforcing bands 26. Each of the reinforcing bands 26 is less able to resist deflection along a lateral axis 100 substantially perpendicular to the glass fibers 28 of the reinforcing band 26. In this manner, each of the individual glass fibers 28, being reinforced with the outer coating layer 30, tends to resist deflection along the length of each glass fiber 28 along the longitudinal axis 98. However, each of the glass fibers 28 encased within the outer coating layer 30 is afforded limited rotational movement around the other glass fibers 28 of the reinforcing band 26 such that some bending occurs across the reinforcing band 26 along the lateral axis 100. In this manner, the reinforcing bands 26 tend to be structurally stronger along the longitudinal axis 98. Accordingly, the first and second reinforcing bands 90, 94 can be placed along the first and second angular orientations 92, 96 in order to provide added structural integrity to the reinforced reaction plate 22 to substantially prevent deflection or other bending in multiple directions. One such orientation is that the longitudinal axis 98 of the first reinforcing band 90 substantially aligns with the lateral axis 100 of the second reinforcing band 94. When so configured, the second reinforcing band 94 supports the reinforced reaction plate along the lateral axis 100 of the first reinforcing band 90, and vice versa. It is further contemplated that in various embodiments, the reinforcing bands 26 can be disposed within the reinforced reaction plate 22 in three or more angular orientations to provide additional structural integrity.

Referring again to FIGS. 9-15, during formation of the reinforced reaction plate 22, the various reinforcing bands 26 can be disposed within a molding form 110 used to create the reinforced reaction plate 22. It is contemplated that the molding form 110 can be any one of various molding forms that can include, but are not limited to, an injection molding form, a compression molding form, a blow molding form, or other similar forming mechanisms. Once the reinforcing bands 26 are disposed within the molding form 110, the forming material 112 is disposed (compressed, molded, formed, injected, blown, etc.) around the various reinforcing bands 26 to form the reinforced reaction plate 22 into a unified member. It is contemplated that this process can be used to form any one of the various members of the airbag assembly 10 that includes one of the reinforcing bands 26 including, but not limited to, the reinforced reaction plate 22, the bin 60, the outer panel 24, the molded surround 64, and others. It is contemplated that the forming material 112 used to create the reinforced reaction plate 22 can be any one of the various materials that can include, but are not limited to, plastic, composite, polymers, combinations thereof and other similar materials that can be formed and/or molded around the reinforcing bands 26. With the reinforced reaction plate 22 having a molded plastic material that is formed around the various reinforcing bands 26, the reinforced reaction plate 22 can be an integral member having the reinforcing bands 26 embedded therein. In this manner, the reinforcing bands 26 and the formed material cooperate to provide added structural integrity to prevent deflection and other bending of the reinforced reaction plate 22 during an inflation event.

Referring again to FIGS. 9-15, it is contemplated that in forming the various embodiments of the reinforced reaction plate 22, or other aspects of the airbag assembly 10 that may include one or more reinforcing bands 26, several configurations of the reinforcing bands 26 are possible. The reinforced reaction plate 22 can include first and second sides 116, 118, where the first reinforcing band 90 is positioned proximate the first side 116 and the second reinforcing band 94 is positioned proximate the second side. In such an embodiment, the first and second reinforcing bands 90, 94 at least partially define the first and second sides 116, 118, respectively, of the reinforced reaction plate 22. In various embodiments, it is contemplated that the first and second reinforcing bands 90, 94 can be positioned against one another to form a single bi-directional reinforcing band. This bi-directional reinforcing band can be installed proximate the first or second sides 116, 118 of the reinforced reaction plate 22 or within a central portion 120 of the reinforced reaction plate 22. It is contemplated that other configurations of the various reinforcing bands 26 are possible where the reinforcing bands 26 are positioned proximate the first or second sides 116, 118 of the reinforced reaction plate 22, or embedded within a central portion 120 of the reinforced reaction plate 22.

Referring again to FIGS. 2-5, when the reinforced reaction plate 22 having the reinforcing bands 26 embedded therein is disposed within the airbag assembly 10, the reinforcing bands 26 can be placed in tension when disposed within the panel receptacle 66. According to various embodiments, disposing the reinforced reaction plate 22, and the reinforcing bands 26 within, in a state of tension can provide additional structural integrity against deflection and other bending within the airbag assembly 10 during an inflation event. Being placed in tension further limits the ability of the reinforcing bands 26 and the reinforced reaction plate 22 to deflect during operation of the vehicle 14, including during an inflation event.

Referring now to FIG. 13-16, having described the airbag assembly 10 and the reinforced reaction plate 22 that incorporates the reinforcing bands 26, a method 500 is disclosed for forming an airbag assembly 10 having a reinforced reaction plate 22 that includes at least one reinforcing band 26. According to the method 500, a first step includes providing at least one reinforcing band 26 (step 502), wherein the at least one reinforcing band 26 includes a plurality of glass fibers 28. Each of the plurality of glass fibers 28 is individually encased within an outer coating layer 30 and set in a substantially parallel configuration. As described above, each of the glass fibers 28 encased within the outer coating layer 30 is set in a substantially flat configuration to form a tape or band. The reinforcing band 26 includes the longitudinal axis 98 which substantially resists bending and provides a primary direction of support that is parallel with the plurality of glass fibers 28. The band also includes the cross or lateral axis 100 that is oriented substantially perpendicular to the plurality of glass fibers 28. The reinforcing band 26 is afforded limited movement along the lateral axis 100 whereby each of the plurality of glass fibers 28 is allowed some minimal movement about the adjacent glass fibers 28. As discussed above, the placement of the reinforcing bands 26 in various different orientations provides additional structure to the reinforced reaction plate 22 by resisting bending along the longitudinal axis 98 of each reinforcing band 26.

Referring again to FIGS. 13-16, once the reinforcing band 26 is provided, the reinforcing band 26 is placed within a molding form 110 to be incorporated within a component of the airbag assembly 10 (step 504). The molding form 110 can include any one of several types of molding forms 110 that can include, but are not limited to, injection forming molds, compression forming molds, blow forming molds, and other similar forming molds and molds used to make components out of a substantially formable material. Once the reinforcing band 26 is placed within the molding form 110, a forming material 112 such as plastic, composite, polymer or other formable material is placed within the molding form 110 (step 506). During the forming process, a forming material 112 is disposed against and around portions of the reinforcing bands 26 to form any one of various components of airbag assembly 10. The components of airbag assembly 10 that can incorporate the one or more reinforcing bands 26 can include, but are not limited to, the reinforced reaction plate 22, the outer panel 24, the bin 60, the molded surround 64 that houses a glove box assembly 40, or other similar formable component of the airbag assembly 10.

Referring again to FIG. 16, in order to complete the airbag panel 16 for the airbag assembly 10, an outer panel 24 and an inflatable member 18 are provided (step 508). To form the airbag panel 16, the inflatable member 18 is placed within a cavity 20 formed between the inner reaction plate and the outer panel 24 (step 510). In the various embodiments, it is contemplated that these three members, the inner reaction plate, the outer panel 24, and the inflatable member 18 disposed therebetween forms the airbag panel 16 for one or more of the various airbag assemblies disposed within the passenger cabin 12 of the vehicle 14. The airbag panel 16 can then be placed in the panel receptacle 66 (step 512).

Referring again to FIGS. 13-16, in various embodiments, it is contemplated that the panel receptacle 66 can be formed by placing at least one receptacle reinforcing band 26 within a receptacle molding form 110 for the panel receptacle 66. As with the molding form 110 previously described, the molding form 110 for the panel receptacle 66 can include various forming molds such as injection forming molds, compression forming molds, blow-forming molds, as well as other similar forming molds. Once placed within the molding form 110, a forming material 112 is placed within the molding form 110 and is formed at least partially around the receptacle reinforcing band 68 to form the panel receptacle 66. It is contemplated that the panel receptacle 66 can be incorporated within a portion of the airbag assembly 10 of the glove box assembly 40, such as the bin 60. Once the panel receptacle 66 is formed, the airbag panel 16 can be attached to a bin 60 which contains the panel receptacle 66, to form a glove box door. The glove box door is then disposed within the molded surround 64 to form a glove box assembly 40 having an airbag assembly 10.

Within the various embodiments, it is contemplated that the various reinforcing bands 26 can be placed within the molding forms 110 in multiple orientations. The various orientations of the reinforcing bands 26 takes advantage of the substantially rigid support provided along the longitudinal axis 98 of each of the reinforcing bands 26. By placing the reinforcing bands 26 in multiple directions within the reinforced reaction plate 22 and other reinforced components of the airbag assembly 10, the reinforcing bands 26 can add structure to the reinforced reaction plate 22 to resist deflection and other bending in multiple directions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An airbag assembly comprising:
   an airbag panel having an inflatable member disposed within a cavity defined between an inner reaction plate and an outer panel; and
   at least one pre-tensioned reinforcing band within at least a portion of the airbag panel and including a plurality of glass fibers, each of the plurality of glass fibers being individually encased within an outer coating layer and set in a substantially parallel configuration.

2. The airbag assembly of claim 1, further comprising:
   a panel receptacle having a receptacle reinforcing band and adapted to receive the airbag panel, wherein the receptacle reinforcing band includes at least one of the at least one reinforcing bands.

3. The airbag assembly of claim 1, wherein the outer coating layer is polypropylene.

4. The airbag assembly of claim 1, wherein the inner reaction plate and an outer panel of the airbag panel are coupled to a bin, and wherein the inner reaction plate, the outer panel and bin form a glove box assembly.

5. The airbag assembly of claim 1, wherein the at least one reinforcing band includes a first reinforcing band placed in a first angular orientation and a second reinforcing band placed in a second angular orientation, wherein the first angular orientation is different than the second angular orientation.

6. The airbag assembly of claim 1, wherein the inner reaction plate is made of at least one of plastic and composite.

7. The airbag assembly of claim 6, wherein the inner reaction plate includes molded plastic, and wherein the molded plastic is formed around at least a portion of the at least one reinforcing band.

8. The airbag assembly of claim 7, wherein the molded plastic is injection molded plastic.

9. An airbag assembly comprising:
   inner and outer panels that are coupled to define a cavity therebetween;
   an inflatable member disposed within the cavity; and
   at least one reinforcing band disposed within at least the inner panel, wherein each at least one reinforcing band is pre-tensioned and includes a plurality of glass fibers, and wherein each of the plurality of glass fibers includes a coating layer.

10. The airbag assembly of claim 9, further comprising:
    a panel receptacle having a receptacle reinforcing band and adapted to receive the inner and outer panels, wherein the receptacle reinforcing band is one of the at least one reinforcing bands.

11. The airbag assembly of claim 9, wherein the coating layer is polypropylene.

12. The airbag assembly of claim 9, wherein the inner and outer panels cooperate to form a compartment door, wherein the compartment door is in communication with a bin having an internal volume.

13. The airbag assembly of claim 9, wherein the at least one reinforcing band includes a first reinforcing band placed in a first angular orientation and a second reinforcing band placed in a second angular orientation, wherein the first angular orientation is different than the second angular orientation.

14. The airbag assembly of claim 9, wherein the inner panel is made of at least one of plastic and composite.

15. The airbag assembly of claim 14, wherein the inner panel includes molded plastic, and wherein the molded plastic is formed around at least a portion of the reinforcing band.

16. The airbag assembly of claim 15, wherein the molded plastic is injection molded plastic.

* * * * *